H. J. WELLS.
CLUTCH.
APPLICATION FILED JULY 16, 1910.
993,007.
Patented May 23, 1911.
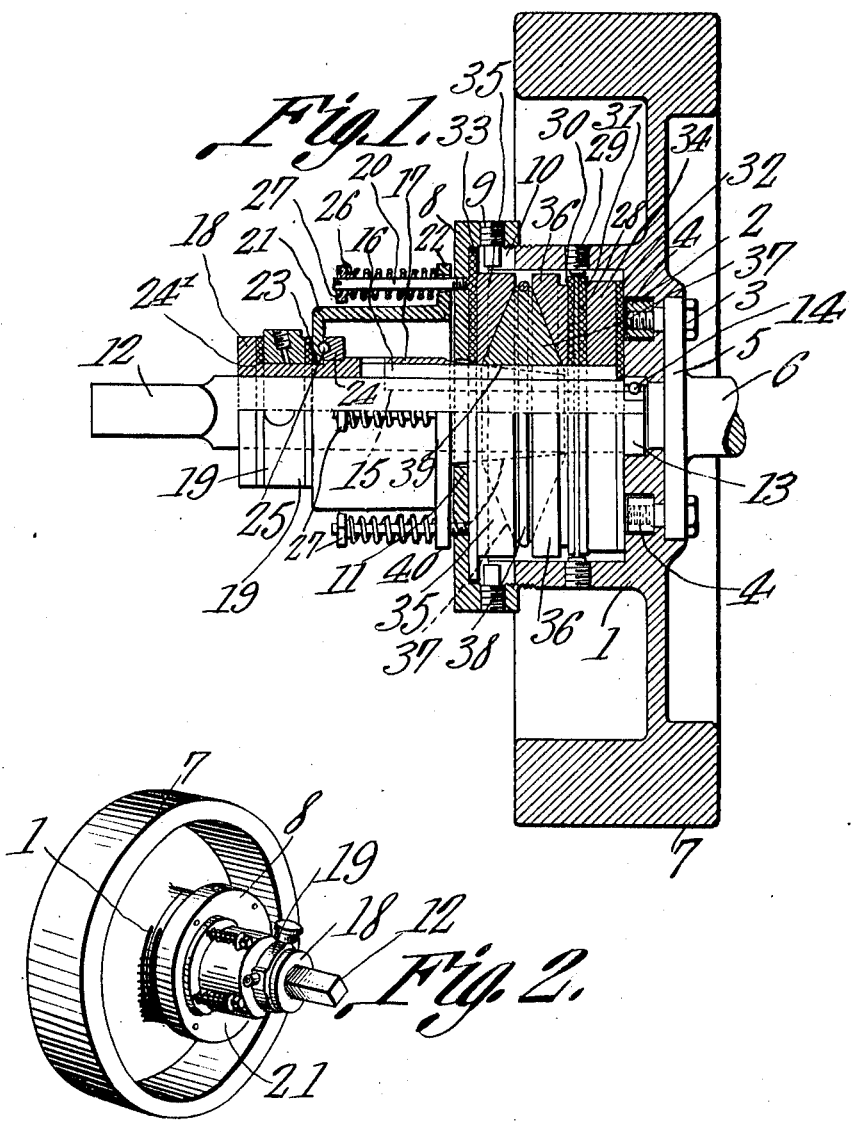

sample
UNITED STATES PATENT OFFICE.

HARVEY J. WELLS, OF PERU, INDIANA.

CLUTCH.

993,007.

Specification of Letters Patent. Patented May 23, 1911.

Application filed July 16, 1910. Serial No. 572,300.

*To all whom it may concern:*

Be it known that I, HARVEY J. WELLS, a citizen of the United States, residing at Peru, in the county of Miami and State of Indiana, have invented a new and useful Clutch, of which the following is a specification.

This invention relates to friction clutches and is more particularly designed as an improvement upon the structure disclosed in Patent No. 967,094, issued to me on Aug. 9, 1910.

One of the objects of the invention is to provide a clutch of this character having friction disks therein formed of a material which will not be affected by heat.

Another object is to provide a novel arrangement of bearings whereby the parts may freely rotate while the clutch is inactive.

A still further object is to provide a device of this character having all adjustments at points where they can be readily effected without disturbing the main portions of the structure.

Another object is to provide yielding means for holding the parts in a predetermined relation.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a view showing the clutch partly in section and partly in elevation. Fig. 2 is a perspective view on a reduced scale of the clutch.

Referring to the figures by characters of reference 1 designates a cylindrical casing open at one end and having recesses 2 in the inner face of the closed end thereof and in which are seated nuts or the like engaged by screws or bolts 3, said nuts being indicated at 4. The bolts or screws 3 serve to fasten a head 5 to the lowest end of the casing 1, said head being formed at one end of a drive shaft 6. Casing 1 may constitute the hub of a fly wheel 7.

A screw cap 8 constitutes the closure of the open end of the casing 1 and may be locked against rotation upon the casing, by means of keys 9 or the like extending through the flange portion of the cap and into openings or slots 10 formed within the casing. The screw cap 8 has a central circular opening 11 therein and into which extends the driven shaft 12, one end of said shaft being reduced annularly as shown at 13 and being provided with a ball bearing 14, whereby friction at this point is reduced to the minimum. A key seat 15 is formed within the shaft 12 and a feather 16 is mounted within said seat and is engaged by a tapered wedging gland 17 which projects through the opening 11 and is provided at its large end with a slide collar 18 engaged by a ring 19 which may be shifted by a lever in any preferred manner.

A series of pins 20 extends from the cap 8, there being preferably four of these pins each of which is screwed or otherwise secured to the cap, all of these pins lying parallel with the longitudinal axis of the shaft 12. A housing 21 extends around the shaft and between the pins and has outwardly directed ears 22 slidably mounted on said pins, there being a circular opening 23 in the closed end of the housing and in which the gland 17 is mounted for rotation. Packing rings 24' are preferably interposed between the ring 19 and the walls of the groove in collar 18 and a retaining ring 24 is mounted on the gland 17 and within the housing and constitutes a seat for a series of balls 25 constituting a bearing for the housing 21 as will be clearly apparent by referring to Fig. 1. Springs 26 are coiled about the pins 20, each spring bearing at one end against the adjoining ear 22 and at its other end against an adjusting nut 27 mounted on the pin 22.

The feather 16 extends loosely through a thin metal disk 28 of steel or the like and which has one or more notches in its periphery for the reception of locking screws 29 which are removably mounted within the casing. Arranged upon the two faces of the disk 28 are friction disks 30 and 31 respectively each of which is preferably formed of asbestos spun and woven in conjunction with a metallic filament, the disk thus produced being capable of resisting heat and thus permitting the clutch to be operated without the use of a lubricant. Another friction washer or disk 32 is arranged upon the inner end wall of the casing 1 and extends around the shaft 12 while a fourth friction disk 33 is located upon the inner face of the screw cap 8 and also extends around shaft 12. These disks 32 and 33 are formed of the same kinds of material as are the disks 30 and 31. A comparatively thick friction disk, preferably of cast iron, and which has been indicated at 34, is interposed between the disks 31 and 32 and is engaged by the feather 16 so as to rotate with the shaft 12.

Opposed duplicate thrust collars 35 and 36 are revolubly mounted within the casing 1 and are interposed between the disks 30 and 33, these collars being loose on the shaft 12. Each collar has a dished contact face adapted to frictionally engage with one of the faces of an expansible friction ring 37 such as disclosed in my application hereinbefore referred to and the sections of which are held normally contracted about the shaft by means of a spring metal split ring 38. The feather 16 extends through a notch 39 formed in the expansible ring and the opening formed through the center of said ring is tapered as indicated by dotted lines at 30 in Fig. 1 so as to receive the tapered gland 17.

It will be seen that the springs 26 exert a constant pressure against the ears 22 so as to force the housing 21 continuously toward the cap 8. This housing therefore presses against the anti-friction balls 25 and a pressure is therefore constantly exerted against the gland 17 and the same is held yieldingly within the casing 1. When said gland is shifted toward the closed end of the casing 1, the tapered portion thereof will act as an expanding wedge and will expand the friction ring 37 and cause it to spread the collars 35 and 36 in opposite directions, collar 35 being forced against the disk 33 while the collar 36 is forced against the disk 30 and thus causes said disk to bind against disk 31 and also causes frictional engagement between the disks 32, 34, 31 and 28 and the inner wall of the casing 1. With the various disks thus in contact, power will be transmitted from shaft 6 through the casing 1 and the various disks to the expanding ring 37 and thence to the shaft 12. By shifting the gland 17 in the opposite direction, the ring 37 will be contacted automatically by the spring 38 and the frictional engagement between the disks will thus be removed and shaft 6 and casing 1 will therefore be free to revolve about the shaft 12 without causing the same to rotate.

Importance is attached to the fact that by using the particular form of friction disk described, the clutch can be used as a dry plate clutch or will operate equally as well in non-fluid oil. It will be seen that the parts can be readily adjusted by means of the screw cap 8 and the other exposed parts and without the necessity of including the main portions of the clutch. Moreover the clutch can be shifted when the transmission gear is set either at low, intermediate or high speed and said clutch will start the shaft 12 smoothly and without causing undue strain on the various parts of the structure actuated by the shaft.

Various changes can of course be made in the construction and arrangement of the parts without departing from the spirit or sacrificing any of the advantages of the invention as defined in the appended claims.

What is claimed is:—

1. The combination with a driving casing and a driven shaft extending into the casing, of clutch members mounted within the casing, an expansible element for shifting said members into frictional engagement, a housing revoluble with the casing and movable axially relative thereto, means slidably mounted on the shaft for expanding said element and connected to said housing for axial movement therewith, and springs adjacent the housing and normally bearing thereagainst to hold said housing normally in a predetermined position.

2. The combination with a driving casing, and a driven shaft projecting into the casing, of clutch members mounted within the casing, an expansible element for shifting said members into frictional engagement to transmit motion from the casing to the shaft, an adjustable cap upon the casing, guide devices extending therefrom, a housing movably mounted on said devices, yielding means for holding the housing normally in a predetermined position, and a wedging gland axially movable with the housing and feathered on said shaft, said gland projecting into the expanding element.

3. A device of the class described including a driving casing, an adjustable cap constituting the closure thereof, clutch elements within the casing, an expansible ring within the casing and shiftable to bind the clutch elements together to transmit motion from the casing to the shaft, a wedging gland feathered upon the shaft, guide pins extending from the cap, a housing slidably mounted on the pins, said gland being slidable with the housing, and springs on the pins and bearing against the housing to hold said housing and the glands normally in predetermined positions.

In testimony that I claim the foregoing as my own, I have hereto affixed my signature in the presence of two witnesses.

HARVEY J. WELLS.

Witnesses:
 EDWARD A. MYERS,
 NOTT N. ARDRIM.